E. J. F. AUDEMARS.
REMOVABLE COUPLING SLEEVE.
APPLICATION FILED JUNE 5, 1917.

1,275,996.

Patented Aug. 13, 1918.

Edmond Jules François Audemars.
Inventor

Lammas Longuer
Attorney

UNITED STATES PATENT OFFICE.

EDMOND JULES FRANÇOIS AUDEMARS, OF PARIS, FRANCE.

REMOVABLE COUPLING-SLEEVE.

1,275,996.  Specification of Letters Patent.  Patented Aug. 13, 1918.

Application filed June 5, 1917. Serial No. 173,061.

*To all whom it may concern:*

Be it known that I, EDMOND JULES FRANÇOIS AUDEMARS, citizen of the Republic of Switzerland, residing at 7 Rue Lalo, Paris, in the Republic of France, have invented new and useful Improvements in Removable Coupling-Sleeves, of which the following is a specification.

The object of the present invention is to provide a coupling sleeve for the tight fixing of tubes in rubber or other elastic material upon pipes or nozzles in metal or other hard substance, this sleeve being principally noteworthy for its removability, that is, it being easy to apply and remove.

The coupler is formed essentially of a sleeve or bushing having an inner conical surface provided with sunken relief parts, while the large end of the cone forms the main opening of the sleeve. The sunken or relief parts may consist of a number of circular grooves of rectangular profile, which are laid out with reference to a common cylindrical surface coaxial with the sleeve and leaving out of account the conical shape of the sleeve. In this case the depth of the grooves will be smaller according as they lie nearer the large end of the cone. These parts in sunken relief may also have the form of spiral grooves with a parallelogram section, and may be single or multiple, and such grooves are also laid out with reference to a common cylindrical surface, and the depth of the spiral grooves diminishes progressively as they approach the large end of the sleeve by reason of its conicity. Again considering the case of sunken portions laid out upon a common cylindrical surface coaxial with the sleeve, it is possible to give the grooves the form of oblique threads or screw threads such as are employed upon the bore of cannon in common practice.

In general the sunken parts can be given any suitable shape which does not interfere with the essential principle of the removability of the coupler. In any case, the sunken parts allow of increasing the utility of the coupler device and of producing greater efficiency as concerns the three following functions for which the coupler is designed and which can only be realized in an imperfect manner by the use of a smooth conical surface, even in case said surface should have a considerable length and shape. These three functions are as follows:

1. To insure a tight joint which will prevent all leakage between the inner and the outer parts of the tubes to be coupled.

2. To prevent any lengthwise slipping of the elastic tube upon the tube of hard material.

3. To prevent any slipping of the coupler proper upon the elastic tube.

In cases where the slipping of the coupler would produce a dangerous effect, the coupler may be provided with a removable safety device for locking it upon the elastic tube.

In the accompanying drawing which is of an illustrative nature:

Figure 1 indicates the method of joining a rubber tube with a metal tube which is carried out by a coupler designed according to the present invention.

Figure 1:
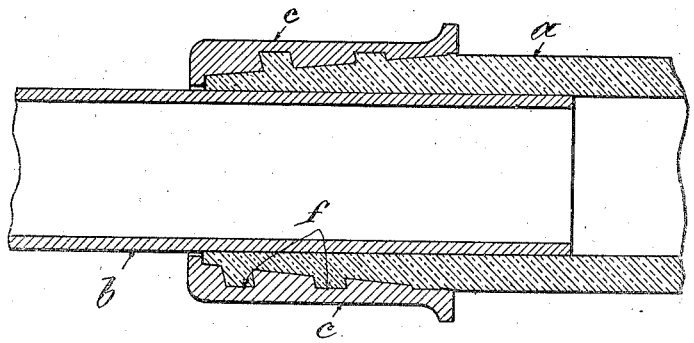

Referring to Fig. 1, the tight joint method according to the present invention consists essentially in the compression of the end of the rubber tube $a$ upon the metal tube $b$ by the pressure exerted by a coupler $c$ of hard material, this coupler having on its interior a conical surface of suitable slope and length and provided with sunken relief portions. In order to apply a coupler sleeve of the present kind it is first slipped over the metal tube $b$ with the small end first, then the rubber tube is fitted upon the tube $b$, and after lubricating the end of the tube $b$, the coupler $c$ is applied in the rubber tube, the coupler $c$ is applied in such manner as to compress the elastic substance in a progressive manner and over almost the whole length of the cone. This elastic substance then expands in the sunken portions as represented at $f$ and thus forms a series of ridges which prevent the coupler from being thrown off on account of the reaction produced by the compression already exerted on the substance.

Figure 2:
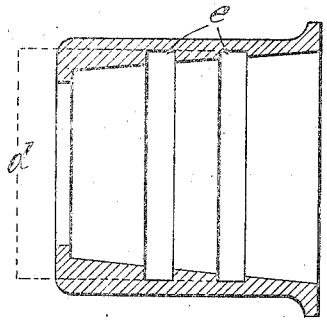
Fig. 2 is a longitudinal section of another type of coupler designed according to the present invention.

As indicated in Fig. 2, the sunken portions may have the form of circular grooves $e$ which are independent of each other and are all laid out according to a common cylindrical surface of diameter $d$ and coaxial with the cone, and owing to the conicity of the sleeve, the depth of these grooves increases as they approach the apex of the cone. This method gives a very tight holding, but it has the drawback of making it difficult to remove the coupler. The inventor claims the originality of this form, but finds it preferable to employ another design in which the grooves are disposed in such manner that they offer little resistance to putting on the coupler or to removing it, and at the same time the coupler has all the required qualities for making the tight joint. These conditions are complied with by giving the grooves a special design in spiral as shown at $f$ in Figs. 1 and 3, and here the profile has the form of a parallelogram. These grooves or threads of spiral form and either single or multiple, are laid out according to a common cylindrical surface of diameter $d^1$; their depth increases progressively on approaching the apex of the cone. The grooves may be used upon the whole length of the conical portion or only upon a part of said length.

It will be remarked that these grooves formed in a cylindrical surface and limited by a conical surface, must be clearly distinguished in their form from an ordinary screw thread upon a cylindrical surface, and even form a screw thread upon a conical surface. In fact, in the method indicated here, the female threads are all brought out to a common cylindrical surface, while the male threads become constantly narrower on account of the conicity of the sleeve. On the contrary, in the case of a conical screw thread, the male and female threads have a shorter diameter according to the progression of the thread from base to summit.

Another application of the present method of disposing certain parts of the cone in sunken relief, consists in employing oblique or screw thread grooves analogous to the grooves used commonly upon the bore of a cannon. Such grooves are indicated at $g$ in Fig. 4; and are laid out upon a common cylindrical surface having a diameter $d^2$; they may be used upon the entire surface of the cone, but it is preferable to employ them upon only a part of this surface in order to assure a tighter fitting of the system.

Figure 3:
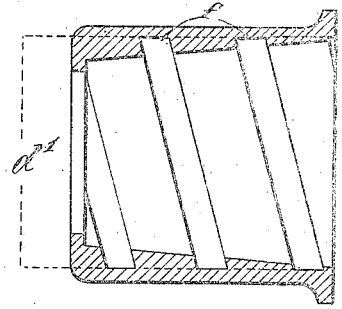
Fig. 3 is a longitudinal section of the coupler represented in Fig. 1.
Figure 4:
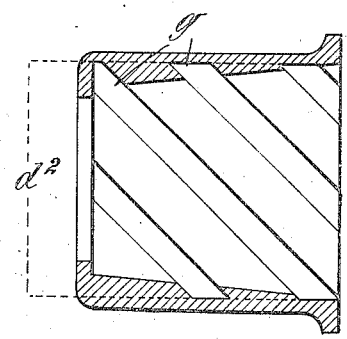
Fig. 4 shows another design for such couplers.

It is readily understood that in the designs indicated in Figs. 1, 3 and 4, the elastic substance expands within the grooves to its primitive shape which is that of a cylinder, and the expansive force needed to produce the pressure at the joint will depend simply upon the force of compression exerted by the cone. Whatever may be the slope of the cone, the screw thread grooves do not act to compress the elastic substance, but on the contrary they facilitate the expansion.

Again referring to the designs indicated in Figs. 1, 3 and 4, it will also be remarked that the grooves or threads act in opposition to longitudinal thrusts exerted along the axis of the tube, and accordingly the coupler is prevented from slipping upon the elastic material. On the other hand, the grooves or threads do not retain the coupler when a tangential movement is given to the surface of the tubes or the coupler.

In case the slipping of the coupler should be attended with dangerous results, a removable fixing device can be employed with the coupler in order to prevent it from slipping off the rubber tube. This latter device may consist of a collar which fits upon the rubber by compression at one end, while the other end is fixed to the sleeve. Another method is to hold on the cone by suitably fixing it to the metal tube.

It is understood that the above-described couplers may be modified in their details of construction without departing from the principle of the invention.

Having now described my invention, what I claim as new and desire to secure by Letters Patent is:

1. A detachable pipe coupling for detachably assembling a tube of hard material and a tube of elastic material consisting in the combination of a tube of hard material, a tube of elastic material whose end is fitted upon the end of the tube of hard material, and a coupler with an internal conical surface designed to be fitted upon the end of the tube of elastic material and provided with sunken portions upon the internal conical surface, the outer parts of these sunken portions being laid out according to a cylindrical surface; substantially as described and for the purpose set forth.

2. A detachable pipe coupling for detachably assembling a tube of hard material and a tube of elastic material, consisting in the combination of a tube of hard material; a tube of elastic material whose end is fitted upon the end of the tube of hard material; and a coupler with an internal conical surface designed to be fitted upon the end of the tube of elastic material and provided with sunken portions upon the internal conical surface, the outer parts of these sunken portions being laid out according to a cylindrical surface coaxial with the conical surface, substantially as described and for the purpose set forth.

3. A detachable pipe coupling for detachably assembling a tube of hard material and a tube of elastic material, consisting in the combination of a tube of hard material; a tube of elastic material whose end is fitted upon the end of the tube of hard material; and a coupler with an internal conical surface designed to be fitted upon the end of the tube of elastic material and provided with sunken portions forming spirals or screw threads laid out upon the internal conical surface, the outer parts of these sunken portions being laid out according to a cylindrical surface coaxial with the conical surface, substantially as described and for the purpose set forth.

In testimony whereof I have signed my name to this specification in the presence of two subscribing witnesses.

EDMOND JULES FRANÇOIS AUDEMARS.

Witnesses:
    Louis Moses,
    Chas. P. Pressly.